Patented Jan. 27, 1942

2,270,874

UNITED STATES PATENT OFFICE 2,270,874

METHOD OF ACTIVATING CATALYTIC SURFACES

Marion H. Gwynn, Leonia, N. J.

No Drawing. Application November 12, 1938, Serial No. 240,007

7 Claims. (Cl. 252—240)

This invention is a continuation in part of pending application Serial Number 86,741, filed June 23, 1936, and entitled Methods of preparing and activating catalytic surfaces.

This invention relates to heterogeneous catalysts and to the preparation and reactivation of active metallic type catalytic surfaces, particularly those of compact surface and adherent or fixed to the underlying metal. These activated surfaces are especially adapted for use in sulphur sensitive hydrofining, i. e. hydrogenating and/or refining oils and other carbonaceous compounds at relatively low temperatures, generally non-pyrolytic. This includes the hydrogenation of carbon monoxide to a mixture of compounds substantially hydrocarbons in the motor fuel range. The activated surface may be used as a dehydrogenation catalyst. The surface coat or layer may also be used as a reagent, as for example in the formation of metallic sulphides; or as adsorption or purifying agents, as in the treatment of vegetable or animal glycerides before steam deodorization, or as when doctor sweetening light petroleum or like distillates, or as tower packing or otherwise.

The essential part of this invention comprises distributing the vapor of nitric acid to the various portions of a metal surface, such as nickel, said vapor attacking the surface to form a nitrate of the catalytic metal. An example of means of distributing the vapor of nitric acid is mixing the vapor with a current of air. Other means of distributing and other purposes subsequently will become apparent. After sufficient vapor nitration, the vapor is withdrawn and the catalytic metal nitrate is decomposed, preferably in a current of air and preferably to a black oxide. Without reduction in hydrogen or further chemical treatment, the surface is then sufficiently active for use in hydrofining. Surfaces spent in hydrofining may be reactivated by means substantially comprising the activation means, particularly maintaining the catalytic metal nitrate coat compact or liquid during or upon vapor nitrating.

Accessory treatments may be used prior to the vapor nitrating step and/or after the nitrate decomposing step, e. g. as shown in the parent application Serial Number 86,741. If the catalytic surface is substantially sulphided during hydrofining or use, the sulphur is preferably removed prior to vapor nitrating, e. g. by roasting, which may be accompanied by steam or superheated steam treatment, or by anodic peroxidation in an aqueous electrolyte of lime or strontia or baryta, or by said roasting followed by peroxidation. Or water washing may be employed prior to vapor nitrating or after nitrate decomposition.

Nitric acid has been previously used for catalyst activation, but generally in liquid form, and generally to be followed by reduction in hydrogen after nitrate decomposition and prior to hydrogenation. The use of liquid nitric acid generally results in substantial losses of the catalytic metal and insufficient and undistributed nitration of substantial portions of the surface. Much of the nitrate coating resulting from liquid nitric acid treatment is usually incompact. When previously disclosed in the vapor form, means of distributing the nitric acid vapors throughout the various portions of the surface have not been used, and reduction in hydrogen prior to use appears to have been necessary. The catalysis effected with such a catalyst would not be uniform, particularly with respect to the rate of catalyst degradation.

Distributing the nitric acid vapor effects subsequent uniform catalysis and minimizes or prevents refluxing off of the catalytic surface by the nitric acid. On reactivation, distributing insures the reactivation of all portions of the catalyst surface or assembly, preventing subsequent premature degradation of the whole by an unnitrated and contaminated portion. Distributing is preferably obtained by a continuous feed or current of vapor as by imparting volume increase and/or motion to the acid vapors, e. g. diluting as with air and/or applying differential pressures. Distributing is aided by applying nitric acid vapor in excess of that combined on the surface. Distributing is aided by maintaining the nitrate coating compact during the vapor nitrating. Distributing is preferably also obtained by limiting the size or shape of the catalyst mass or assembly, as will be described. Uniform temperatures throughout the various portions of the surface are useful in indicating or obtaining distribution.

The preferred form of this invention comprises distributing an excess of the vapor of heated or boiling nitric acid in a continuous current to the various portions of the surface, and continuing to distribute an excess of the vapor until the various portions of said surface are compactly coated with catalytic metal hydrated nitrate to an average depth of at least $10^3$ or $10^4$ but less than about $10^5$ atoms of the catalytic metal; then gently heating to decompose said coating of nitrate to an oxide of the catalytic metal, preferably in a stream of air. The surface is catalytic without further treatment, and maintains a slow and uniform degradation rate during catalysis.

The contacting vapor of nitric acid or nitric acid air mixture is preferably supersaturated, as may be obtained by slightly chilling or condensing the vapor before introducing to the various portions of the catalytic surface, avoiding superheated vapor, particularly during the early stages of nitration.

The common sulphur sensitive hydrogenating or hydrofining catalytic metals may be activated by this invention, e. g. copper or nickel or cobalt. A mixture of these with others of the group or other metals may also be reactivated, particularly if the nitrate layer yields a black oxide on gentle roasting. A metal mixture may be used which is similar to nickel and cobalt in the color of the gently decomposed oxide and in the catalytic properties of that oxide, preferably also in ductility and ferromagnetism as bulk metal. Palladium may also be reactivated by this invention.

The catalyst support is preferably the catalytic metal itself, although in bulk or noncatalytic form. However, other supports may be used, e. g. unglazed porcelain or alumina in a porous and granular form. The unglazed porcelain or alumina may be impregnated with molten hydrated nickel nitrate, the nitrate may then be decomposed, the catalyst may be subsequently used and then reactivated as described herein.

An assembly for this invention may be made by electroplating a catalytic metal upon a less noble or less catalytic metal, preferably assembling and then heavily electroplating. The electroplating is preferably at a relatively high current density and concentration of electrolyte. An example of a nickel plating bath is a strong iron-free aqueous solution of nickel sulphate, together with sufficient minor quantities of boric acid and nickel chloride or ammonium chloride to maintain a uniform dissolution of the nickel anode. The nickel is preferably plated on a copper assembly.

The invention is not confined to theories expressed herein, nor to the following examples:

Example 1

The vapor nitrating vessel comprises an acid resisting closed and jacketed cylindrical vessel for containing liquid nitric acid at the bottom and the catalyst above, with a free space between the acid and catalyst. The nitrating vessel also contains means of introducing a stream of air into the liquid acid. The jacket may be partially filled with water to surround the bottom and the lower portion of the sides of the nitrating vessel. Direct heat or steam may be applied to the water to heat it. The upper portion of the jacket may have a vented trap to regulate the pressure and release the air of the resulting steam from the jacket.

The nickel catalyst to be vapor nitrated is assembled in a cylindrical screen cage 2 inches in diameter and 36 inches in length. This is filled with 4½ pounds of clean nickel turnings whose average cross-sectional area is about 0.0002 square inch, and whose average thickness is 0.016 inch. The superficial area of the turnings is about 3,500 square inches, the facial area of assembly is substantially that of the screen, viz. $36 \times 2$ pi$=226$ square inches, and the ratio thereof termed the surface ratio is 15.5. The surface ratio of an otherwise similar cage but 3 inches in diameter is ½ greater. In this invention, the surface ratio is preferably maintained at a value less than about 80, e. g. between 15 or 20 and 30 or 40.

To vapor nitrate the cage, the latter is inserted and the heat is turned on. A gentle stream of air is then passed through the aforesaid means of introducing air and subsequently the liquid acid is run into the vessel. The acid vapor air mixture moves up, around and into contact with the cage contents. The excess acid passing out above the cage may be recirculated or recovered from the air and returned to the bottom of the nitrating vessel. The air in the vapor mixture may be regulated to distribute the acid over the surface as may be determined by visual inspection or by the constancy of various catalyst temperature readings or by a subsequent test. For example, small samples of turnings may be removed from various portions of the cage, an equal weight of each sample may be immersed in aqueous ammonium hydroxide to dissolve the nitrate, and the color of the various solutions may then be compared. The nitration is continued until the surface is coated with a layer of nickel nitrate at least $10^3$ or $10^4$ but averaging less than about $10^5$ nickel atoms deep, e. g. until the net weight increase is between ¼ and ½ pound.

After discontinuing the nitration, the cage may be cooled, stored or shipped dry, or may then be gently roasted at near about the lowest temperatures required to decompose the nitrate, e. g. at near about 300° C. in a current of air until the brown fuming ceases. A relatively short contact or time at higher temperatures may be used.

The resulting nickel oxide is black and is generally catalytic without further treatment.

A cobalt or a cobalt and nickel surface may also be treated as in this example.

The vapor nitrated and gently roasted catalyst may be used in sulphur sensitive hydrofining and may then be reactivated in a similar manner. Preferably the nickel nitrate is maintained in a compact form during the vapor nitration. For example, the nitrate coating is maintained in a liquid or viscous state as by moistening the air previous to contact with nitric acid or by continuously or discontinuously diluting the liquid acid to a concentration slightly more aqueous than the constant boiling mixture. The aqueous content of the nitrate coat may for instance be more hydrous than the dihydrate of nickel nitrate, about corresponding to the trihydrate, for example. The extent of the vapor nitration is preferably maintained nearly constant or uniform on successive reactivations.

During the next step or immediately subsequent to vapor nitrating, the temperature may be raised to about the temperatures where both incipient nitrate decomposition and nitric acid synthesis from the oxidation of nitrogen oxides occur. The pressure also may be raised. Maintaining nitric acid synthesizing conditions on an oxide surface during reactivation by vapor nitration, or other conditions which darken or enrich the blackness of the color of the subsequently decomposed catalytic metal nitrate, may lessen the requirement of applied nitric acid. This or subsequent decomposing or roasting of the catalytic metal nitrate may more completely nitrate or oxidize contaminants. Nitrogen oxides resulting from the decomposition step of the catalytic metal nitrate may be recovered and reused, e. g. by oxidation and absorption, to reform nitric acid.

Example 2

An assembly composed of 16 parallel nickel screens attached together is vapor nitrated essentially through the two flat faces. A number of such assemblies may be spaced apart in parallel and vapor nitrated in a modification of the vapor nitrating vessel in Example 1. For instance the vessel, which may consist of enamel lined stainless iron, may be horizontal with the vapors circulating up and through the space between each assembly. The diameter of the screen wire is about 0.016 inch (0.04 cm.) and adjacent parallel wires are 0.095 inch (0.24 cm.) apart on centers, the surface ratio being about 4.5. The time of vapor nitrating under otherwise similar conditions would be less than one half that in Example 1. Where many assemblies are nitrated in the same vessel, a manifold distributor may be used to decrease the volume of air used. After vapor nitrating, the nitrate coating may be decomposed, preferably to the black oxide, e. g. as described in Example 1.

Cobalt surfaces may be similarly reactivated.

Continuous vapor nitrating may be carried out in a modified vapor nitrating vessel, preferably horizontal, moving the catalyst through the nitrating vessel on an acid resisting conveyor. The catalytic material is preferably chilled to solidify the nitrate coating prior to discharge from the conveyor. Granular or impregnated catalyst may be thus continuously vapor nitrated, or as in Example 1 when caged. This assembly, whether caged or uncaged, is preferably limited to a relatively low value of the surface ratio, similar to or below that shown in Example 2.

Nitric acid may be boiled in a separate vessel, and the vapors may be led from this vessel into the vapor nitrating vessel containing the catalytic surface.

The methods and constructions described herein may be used in conjunction with other treatments, particularly those described in the copending applications of the applicant, or may be otherwise used.

The parent application Serial Number 86,741 describes the anodic peroxidation of a decomposed nitrate surface, after forming the nitrate by immersing the surface in the vapors of heated nitric acid. The catalytic metal is readily peroxidizing and desulphurizing. The anodic peroxidation aqueous electrolytic bath is of low activity coefficient in whose anolyte hydroxyl is the predominant anion, preferably containing the hydroxide of a metal selected from the group which consists of calcium, strontium and barium, or from the group which consists of lithium, calcium, strontium and barium. These and the other electrolytes described in the said copending application may be used before or after vapor nitrating and decomposing of the nitrate. When using vapor nitrating as described herein in conjunction with anodic peroxidation in a bath containing the hydroxide of a metal selected from the group consisting of calcium and strontium and barium, the surface ratio of the assembly is preferably maintained of a low value, e. g. rapid activation is obtained when said value is above unity but less than about 4 or 5. For example an activated assembly as described in Example 2, and then spent in sulphur sensitive hydrofining, may be reactivated by a process comprising anodic peroxidation with an aforesaid preferred electrolyte and subsequent vapor nitration and nitrate decomposition as described herein. Water washing, then drying, is preferably employed after anodic peroxidation and before vapor nitrating.

Copending application Serial Number 117,515, now U. S. Patent 2,191,464 describes activating a catalytic metal surface with a highly alkaline hypobromite or hypochlorite solution after partially activating the surface with the vapors of heated nitric acid to form the nitrate and decomposing the nitrate to an oxide of the catalytic metal by gentle roasting. The hypohalite treatments described in said copending application may be used after the activation treatment heretofore described in this invention.

While unnecessary to render catalytic, the decomposed oxide from the vapor nitrated surface may be reduced in hydrogen prior to catalysis, in order to modify said catalysis. For example, prior reduction in hydrogen may be used to inhibit subsequent catalytic reactions other than simple hydrogenation or dehydrogenation. When used for the hydrogenation of glycerides as described in the applicant's copending application Serial Number 233,032, filed October 8, 1938, the vapor nitrated and gently roasted nickel catalyst is preferably reduced in hydrogen.

After hydrogenating and/or purifying fatty or like compounds, particularly those which are not readily nitrated, these compounds or impurities may be extracted, as by refluxing with volatile hydrocarbons. Or more polar solvents such as dichlorethylene or acetone may be used, particularly for a final or complete extraction or when using the catalyst as a purifying agent.

Hydrofining with the surfaces described herein may be carried out for example as described in U. S. Patent 2,073,578 and the copending application Serial Number 130,478 entitled Method of continuously hydrofining carbonaceous vapors with solid sulphur sensitive catalytic surfaces, filed March 8, 1937 now U. S. Patent 2,174,510. Desulphurization of organic compounds or solutions by these catalysts is preferably accompanied by hydrogenation particularly replacing the sulphur with hydrogen. For example, a sulphurous and light petroleum distillate may be sulphur sensitive hydrofined, the spent catalytic surface may subsequently be roasted to convert the sulphide of the catalytic metal substantially to an oxide, the roasted surface may then be subjected to vapor nitrating as described, the nitrate may be decomposed, and then without further chemical treatment the activated surface may be used for hydrofining at a temperature below said sulphide roasting temperatures and below the temperature at which substantial pyrolysis occurs with said distillate.

What is claimed is:

1. In a method of activating the catalytic properties of a porous mass of comminuted metal having extended surfaces of a sulphur sensitive hydrofining metal the step of treating said metal by conveying a wet mixture of nitric acid vapors and a non poisoning gas to said metal until an even adherent coating of hydrated nitrate of said metal having a substantially uniform depth of at least $10^4$ metal nitrate atoms is formed.

2. A method as described in claim 1 in which the average depth of the nitrate coating is less than $10^5$ nitrated metal atoms, and in which the ratio of the superficial area of the extended surfaces to the smooth facial area of the assembled surfaces exposed to the nitric acid vapors is maintained less than about 80.

3. A method as described in claim 1 and subsequently gently heating to decompose said metal nitrate to the metal oxide.

4. In a method of reactivating the catalytic properties of a porous mass of comminuted metal having extended surfaces of a sulphur sensitive hydrofining metal, the steps of treating said metal by conveying a wet mixture of nitric acid vapors and a non poisoning gas through the free spaces of an assembled catalytic layer at an elevated temperature such that nitric acid substantially but incompletely condenses upon the catalytic surfaces forming an adherent coating of hydrated nitrate of said metal having a substantially uniform depth of at least $10^4$ metal nitrate atoms, and subsequently further heating to decompose said metal nitrate to a metal oxide.

5. A method as described in claim 4 in which the sulphur sensitive hydrofining metal is nickel and in which the surface was previously activated by coating with a strong aqueous nickel nitrate solution followed by gentle heating to decompose said nickel nitrate to a black nickel oxide.

6. In a method of activating the catalytic properties of a porous mass of comminuted metal having extended surfaces of a sulphur sensitive hydrofining metal the steps of treating said metal by conveying a wet mixture of nitric acid vapors and a non poisoning gas to said metal until an even adherent coating of hydrated nitrate of said metal having a substantially uniform depth of at least $10^4$ metal nitrate atoms is formed, then substantially decomposing the metal nitrate by heating above 200° C., and subsequently further activating the surface anodically in an aqueous electrolytic bath of low activity coefficient and in whose anolyte hydroxyl is the predominant anion.

7. A method as described in claim 6 in which the sulphur sensitive hydrofining metal is supported on an electrical conducting base, and in which the electrolytic bath comprises the hydroxide of a metal selected from the group which consists of calcium, strontium and barium.

MARION H. GWYNN.